(12) United States Patent
Jones et al.

(10) Patent No.: US 10,956,884 B2
(45) Date of Patent: Mar. 23, 2021

(54) SYSTEM AND METHOD FOR PRODUCT DISPLAY

(71) Applicant: Sunrise R&D Holdings, LLC, Cinicinnati, OH (US)

(72) Inventors: Titus Arthur Jones, Hebron, KY (US); Brett Bracewell Bonner, New Richmond, OH (US)

(73) Assignee: Sunrise R&D Holdings, LLC, Cincinnati, OH (US)

( * ) Notice: Subject to any disclaimer, the term of this patent is extended or adjusted under 35 U.S.C. 154(b) by 195 days.

(21) Appl. No.: 16/172,321

(22) Filed: Oct. 26, 2018

(65) Prior Publication Data

US 2020/0134589 A1  Apr. 30, 2020

(51) Int. Cl.
*G06Q 20/20* (2012.01)
*G06K 19/077* (2006.01)
*G06Q 10/08* (2012.01)

(52) U.S. Cl.
CPC ..... *G06Q 20/201* (2013.01); *G06K 19/07758* (2013.01); *G06Q 10/087* (2013.01)

(58) Field of Classification Search
CPC ............... G06Q 20/201; G06Q 10/087; G06Q 30/0623; G06Q 30/02; G07F 9/023; G07G 1/009; G06K 19/07758
USPC ......... 705/14.38, 16, 20, 28; 340/10.1, 10.2, 340/10.6, 572.1, 572.8; 235/377–385
See application file for complete search history.

(56) References Cited

U.S. PATENT DOCUMENTS

| 6,146,158 | A | * | 11/2000 | Peratoner | H01R 25/142 439/110 |
| 6,844,821 | B2 | * | 1/2005 | Swartzel | G06Q 30/06 235/385 |
| 7,152,040 | B1 | * | 12/2006 | Hawthorne | G06Q 10/087 705/16 |
| 8,050,984 | B2 | | 11/2011 | Bonner et al. | |
| 8,217,761 | B2 | * | 7/2012 | Jo | G06K 7/0008 340/10.2 |

(Continued)

OTHER PUBLICATIONS

International Search Report and Written Opinion of the International Searching Authority dated Jan. 29, 2020 issued in corresponding International Application No. PCT/US2019/056666 (10 pgs.).

*Primary Examiner* — Andrew Joseph Rudy
(74) *Attorney, Agent, or Firm* — Pillsbury Winthrop Shaw Pittman LLP

(57) ABSTRACT

A system and method for displaying product information in a store. The system is configured to communicate with a communication network. Included is a shelf display device or digital tag positioned within the store and a physical, bib tag for a product. The digital tag has a digital display surface, a reader, and a communication device. The digital tag is configured to display information associated with a product via its display surface and configured for operative communication with the communication network via its communication device. The bib tag has product-related information displayed thereon. The bib tag also has machine readable information that is readable by the reader of the digital tag. The communication device of the digital tag is configured and arranged to transmit information, regarding the machine readable information of the bib tag, to the communication network.

12 Claims, 11 Drawing Sheets

(56) References Cited

U.S. PATENT DOCUMENTS

| | | | |
|---|---|---|---|
| 8,698,606 B2* | 4/2014 | Choi | G06Q 30/06 |
| | | | 340/10.6 |
| 9,235,375 B2* | 1/2016 | Byers | G06F 3/1431 |
| 9,547,464 B2* | 1/2017 | Nunez | G06F 3/1205 |
| 9,703,179 B2 | 7/2017 | Bonner et al. | |
| 10,210,478 B2* | 2/2019 | Johnson | G06Q 30/02 |
| 10,262,026 B2* | 4/2019 | Henocque | G06F 16/164 |
| 10,357,118 B2* | 7/2019 | Swafford | A47F 5/0068 |
| 10,523,443 B1* | 12/2019 | Kleinman | H04L 63/0853 |
| 10,665,005 B2* | 5/2020 | Yochum | G06Q 50/184 |
| 10,685,276 B2* | 6/2020 | Woolf | B32B 7/12 |
| 2002/0109593 A1 | 8/2002 | Swartzel et al. | |
| 2011/0102155 A1 | 5/2011 | Choi et al. | |
| 2014/0374474 A1* | 12/2014 | Huang | G06Q 30/0623 |
| | | | 235/375 |
| 2015/0112790 A1* | 4/2015 | Wolinsky | G06Q 20/32 |
| | | | 705/14.38 |
| 2017/0285449 A1 | 10/2017 | Bonner et al. | |
| 2019/0279204 A1* | 9/2019 | Norton | H04L 9/0643 |
| 2020/0126125 A1* | 4/2020 | Sanjay | G06Q 30/0261 |

\* cited by examiner

SYSTEM AND METHOD FOR PRODUCT DISPLAY

TECHNICAL FIELD

The description herein relates generally to display shelves for displaying products and, more specifically, to display shelves having electronic shelf displays for reading machine-readable media on bib tags, and methods for using the same.

BACKGROUND

In retail environments, products are typically stored and displayed for purchase on shelving units. A front edge of the shelving units typically includes consumer readable information describing the products displayed, along with pricing and other information including unit pricing, product weight or size, sale or discount information, and other relevant information. When prices or products change, sales associates are often tasked with changing the tags to reflect the changes in the products. Replacement of tags is a time consuming and laborious process.

A number of electronic solutions have been proposed, wherein LCD or LED displays are incorporated into the shelving units or affixed to the front edge thereof. Such electronic tags may be programmed to display the same types of information as the paper products, as well as providing the ability to include dynamic messaging including attention getting messages changing throughout the day.

SUMMARY

An aspect of an embodiment includes a system for displaying product information in a store, the system being configured to communicate with a communication network. The system includes: a digital tag positioned within the store and a physical, bib tag for the product. The digital tag has a digital display surface, a reader, and a communication device. The digital tag is configured to display information associated with a product via its display surface and configured for operative communication with the communication network via its communication device. The bib tag has product-related information displayed thereon. The bib tag also has machine readable information that is readable by the reader of the digital tag. The communication device of the digital tag is configured and arranged to transmit information, regarding the machine readable information of the bib tag, to the communication network.

Another aspect of this disclosure is a method for displaying product information in a store using a system that is configured to communicate with a communication network, the system having the digital tag and bib tag described above. The method includes: displaying information associated with a product via the display surface of the digital tag; reading the machine readable information of the bib tag using the reader of the digital tag; and transmitting information, regarding the machine readable information of the bib tag, to the communication network using the communication device of the digital tag.

The above summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features will become better understood with regard to the following description, pending claims and accompanying drawings where:

DETAILED DESCRIPTION

The embodiments herein may display a variety of information useful to consumers shopping at a store that sells products, for example. Referring generally to the figures, embodiments described herein are directed to systems and methods relating to providing shelf display units and bib tags for graphically presenting information on shelf display units to a consumer. It may be useful to combine features of electronic displays and paper (bib) tags, for example. This may, however, give rise to issues in which the paper tags, which are static, are not coordinated with the information in the dynamic electronic displays on the shelves. As such, the inventors have determined that it may be useful to provide the electronic displays with an ability to monitor the status of paper tags to ensure that there is not contradictory information being provided to customers.

Figure 1:
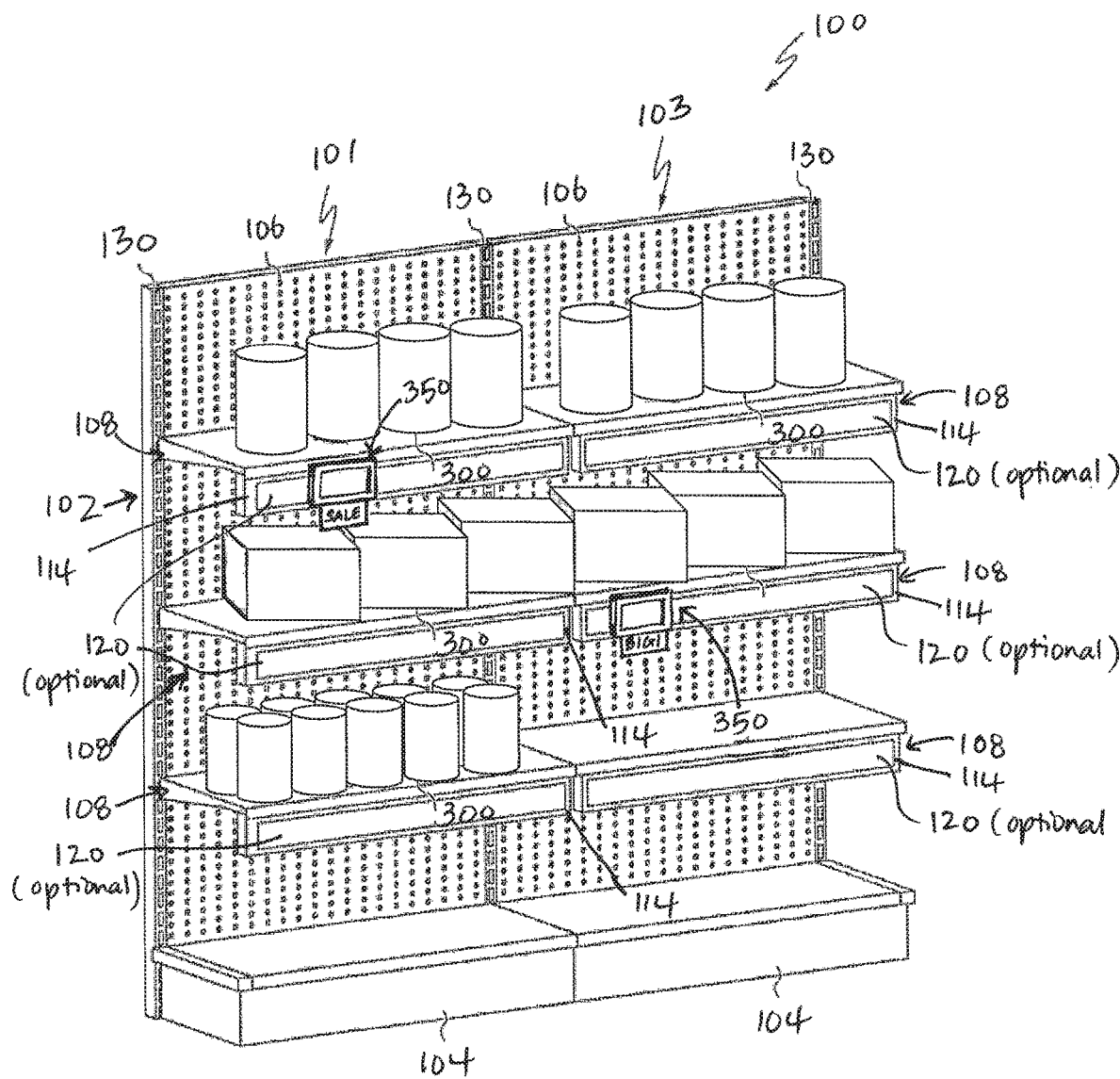
FIG. 1 schematically depicts angled view of a modular shelving system used in a system for displaying product information in a store, according to one or more embodiments shown and described herein.

FIG. 1 shows a perspective view of a modular shelving system 100 used in a store including a first shelving module 101, a second shelving module 103, and a plurality of interfacing uprights 130. Each of the first shelving module 101 and the second shelving module 103 includes a base portion 104, a back plane portion 106, and one or more display shelf modules 108 (or shelves). As described later below, in accordance with one embodiment, one or more of the shelf modules 108 include display units or display panels 120, e.g., a shelf incorporating an electronic display and tag reader. The modular shelving system 100 is used to display consumer goods includes a display shelf module for use with the same, such that information may be presented to the consumer/customer in the store. It must be appreciated that shelves and shelving units can be crafted in many different ways.

Figure 2:
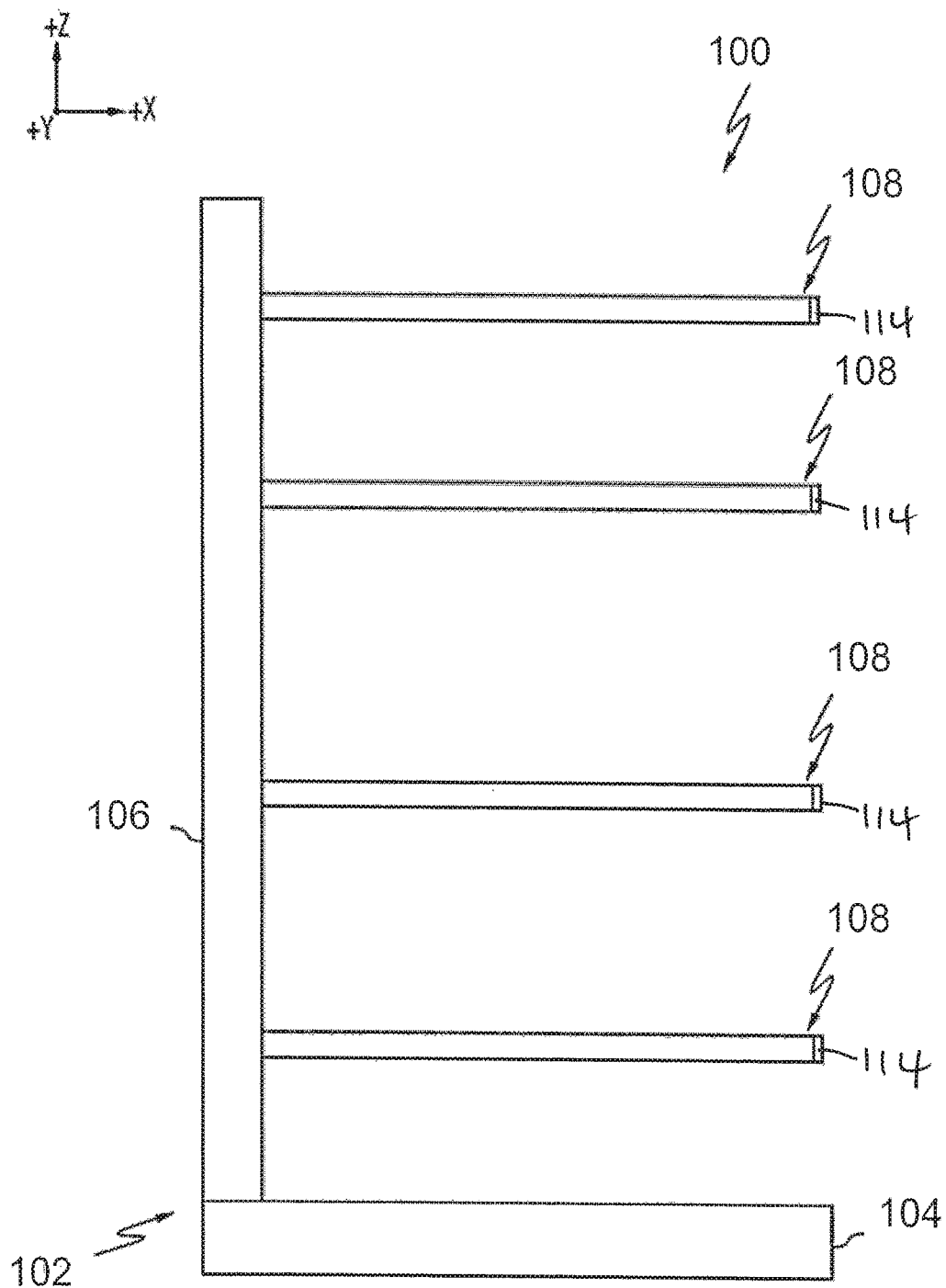
FIG. 2 schematically illustrates a side plan view of a shelving unit of the system of FIG. 1 in accordance with an embodiment.

FIG. 2 shows a cross section of the modular shelving system 100 with just the shelf support frame 102, base portion 104, and a back plane portion 106. The base portion 104 has a generally planar configuration, as depicted in FIG. 1, and supports the back plane portion 106. The back plane portion 106 extends from the base portion 104 in a substantially vertical direction (i.e., the +Z direction of the coordinate axes depicted in FIG. 1, or perpendicularly from the base portion 104). The base portion 104 and the back plane portion 106 may be generally formed from metallic materials such as steel, aluminum alloys, or any other material suitable for load-bearing applications. The base portion 104 and the back plane portion 106 may be constructed as a single unitary piece, such as when the base portion and the back plane portion 106 are joined by welding or the like. Alternatively, the base portion 104 and the back plane portion 106 may be formed as independent pieces and joined together with mechanical fasteners, such as screws, bolts or the like.

Figure 3:
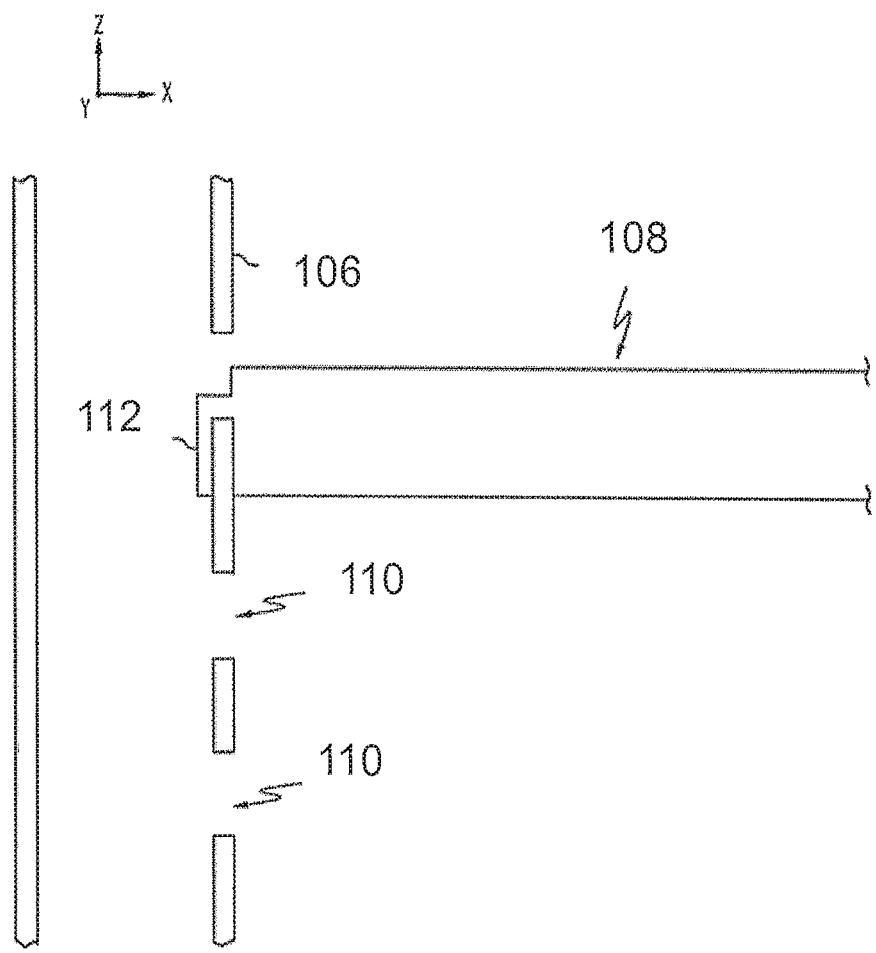
FIG. 3 schematically illustrates a partial cross section of the shelving unit of FIG. 2 in accordance with an embodiment.

The modular shelving system 100 also includes one or more display shelf modules 108 which are removably coupled to the shelf support frame 102 such that the vertical and/or horizontal spacing between adjacent shelves is adjustable. For example, in the embodiments described herein, the display shelf modules 108 are removably coupled to the back plane portion 106 of the shelf support frame 102. Specifically, the back plane portion 106 of the shelf support frame 102 is formed with a plurality of mounting apertures 110. The mounting apertures 110 are arrayed over the surface of the back plane portion 106 at regular intervals in the Y and Z directions to facilitate adjustably supporting one or more display shelf modules 108 on the back plane portion 106. As shown in FIG. 3, for example, each display shelf module 108 may include one or more mounting clips 112 extending from the posterior end of the display shelf module 108. To support the display shelf module 108 on the back plane portion 106 of the shelf support frame 102, the display shelf module 108 is positioned such that the mounting clips 112 are inserted into corresponding mounting apertures 110 in the back plane portion 106. The weight of the display shelf module 108 locks the mounting clips 112 to the back plane portion 106 thereby securing the display shelf module 108 to the back plane portion 106 of the shelf support frame 102.

The mounting apertures 110 may be arrayed over the surface of the back plane portion 106 at regular intervals. The array of mounting apertures 110 facilitates positioning and repositioning the display shelf modules at various locations on the back plane portion 106. Accordingly, it should be understood that the display shelf modules 108 of the modular shelving system 100 may be arranged on the shelf support frame with various relative vertical and/or horizontal spacings (i.e., +/−Z and/or +/−Y in the coordinate axes depicted in FIGS. 1 and 2) between adjacent display shelf modules.

In another embodiment, the shelf modules 108 are secured to the plurality of interfacing uprights 130 (shown in FIG. 1), each of which includes a plurality of apertures, much like apertures 110 as described above and shown in FIG. 3), through which corresponding clips 112 of the shelf modules 108 may be inserted to mount the shelves to the system.

Figure 4:
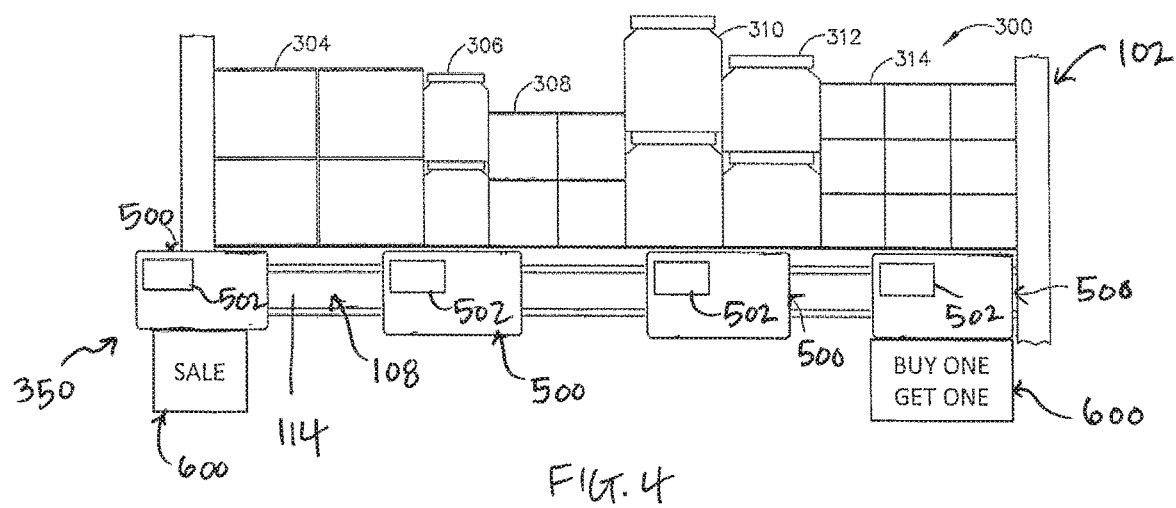
FIG. 4 schematically illustrates a shelf of the system of FIG. 1 with products thereon, shelf display units, and bib tags in accordance with an embodiment of the system for displaying product information in a store.
Figure 5:
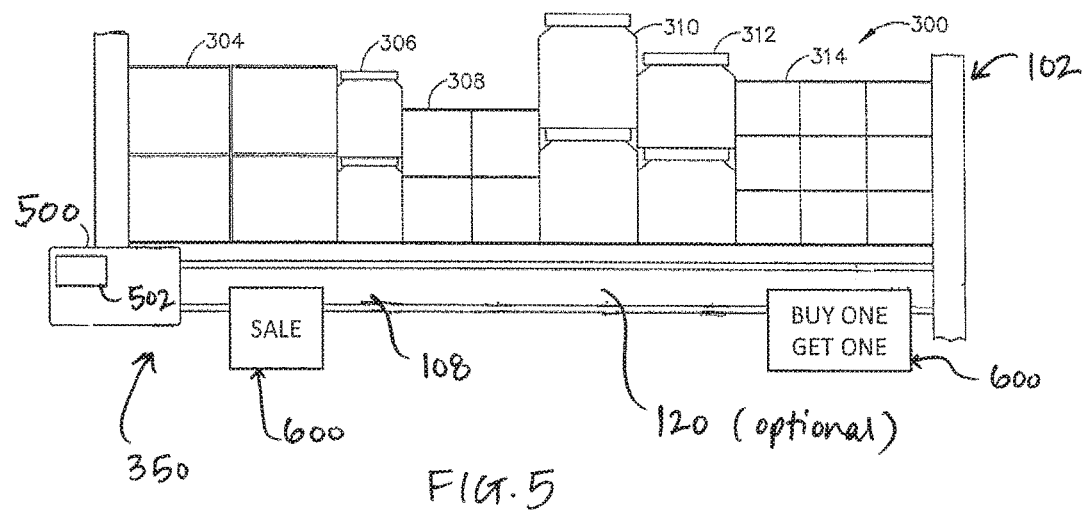
FIG. 5 schematically illustrates an alternate embodiment of the system for displaying product information in a store including products, shelf display units, and bib tags.

Generally, the shelves 108 extend substantially perpendicularly from the back plane portion 106 in a direction that is substantially parallel to the base 112. The assembly or system 100 supports the plurality of shelves 116 on which products 300 may be placed, such as shown in greater detail in FIGS. 4 and 5, as well as FIG. 1. Each shelf or shelf module 108 includes a front edge 114 that faces the consumer or customer. In an embodiment, this front edge 114 is a surface that is configured to receive items thereon. For example, the edge 114 may have a tag, sticker, paper, or device attached thereto. The edge 114 may include top and bottom portions with notches or slots to contain such tags, stickers, papers, or devices attached thereto. In an embodiment, this front edge 114 includes a display panel 120, such as shown in FIG. 5 and described later with reference to FIG. 17.

Figure 19:
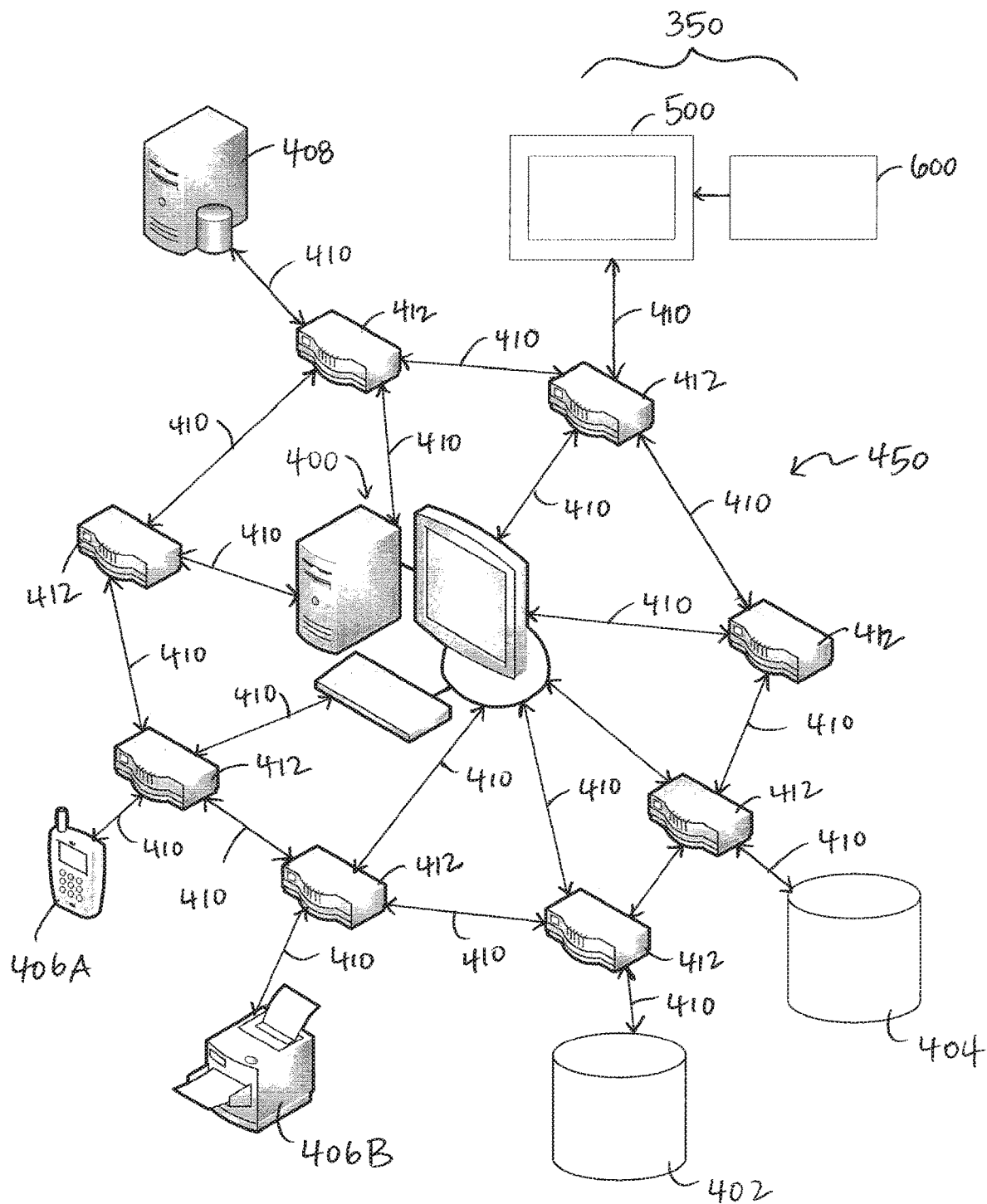
FIG. 19 is an exemplary view of a network, shelf display tag, and bib tag that are in communication in the disclosed system, according to an embodiment herein.

Also shown in FIG. 1 are parts of a system 350 (also shown in FIG. 6) that are configured to communicate with a communication network 450 (shown in FIG. 19). Specifically, in accordance with an embodiment, a system is provided that includes a shelf display device 500 (i.e., "digital tag") and a bib tag 600 (e.g., a physical, paper tag) for one or more products positioned within the store, i.e., provided on the shelves 108. For example, FIGS. 4 and 5 illustrate exemplary front views of a shelf 108 with products 300 thereon. Both FIGS. 4 and 5 show a variety of products 304, 306, 308, 310, 312, and 314 positioned along shelf 108. In the exemplary embodiment of FIG. 4, a number of shelf display devices or digital tags 500 are positioned along the edge 114 of the shelf. Each digital tag 500 is typically associated with at least one product, e.g., product 304, 306, 310, and 314. Also provided are bib tags 600. As explained in greater detail below, each bib tag 600 has product-related information thereon and is associated with a digital tag 500. FIG. 4 shows one embodiment of a bib tag 600 connected or mounted to a particular digital tag 500. In the exemplary embodiment of FIG. 5, a digital tag 500 is positioned near an end of the shelf (e.g., a left end as shown here, although such depiction is not limiting). FIG. 4 also shows the bib tag 600 displayed below or under the digital tag 500. FIG. 19 shows one of the many alternative orientations. FIG. 5 shows another embodiment wherein bib tags 600 are connected or mounted to an edge 114 of the shelf 108 while still being associated with the digital tag 500. While it is typically attached to a shelf, the digital tag 500 may be on a free-standing unit, it may be outdoors, it may be attached to a stand, on the side of a shelf, or may even hang from the ceiling or be on a shopping cart, so long as it is in near enough proximity to that which it is supplying the information for. Accordingly, use of the term "shelf display device" herein is not intended to limit the meaning of the device 500 or the digital tag 500 to being positioned on a shelf; rather, it is intended to refer its relationship to a product on a shelf Although several embodiments are discussed herein for placement of the digital tag 500 and bib tags 600 relative to shelves, the system 350 is designed such that the display device 500 is configured to understand information associated with bib tag 600 in a number of ways, and not necessarily such that they are directly connected to each other and/or to a shelf.

FIGS. 6-11 schematically show features of the shelf display device 500. The shelf display device 500, also referred to as a digital tag 500, may be a unit that includes a housing or body having a front 504, back 510, top 505, and bottom 507. The digital tag 500 has a digital display surface 502 (see FIGS. 6, 7, and 8), a reader 528 (see FIG. 11), and a communication device 526 (see FIG. 11). Generally, as described herein, the shelf display device 500 or digital tag is designed such that it includes an ability to read information from an associated bib tag as well as communication or transmission capabilities for transmitting and forwarding the read information.

Figure 7:
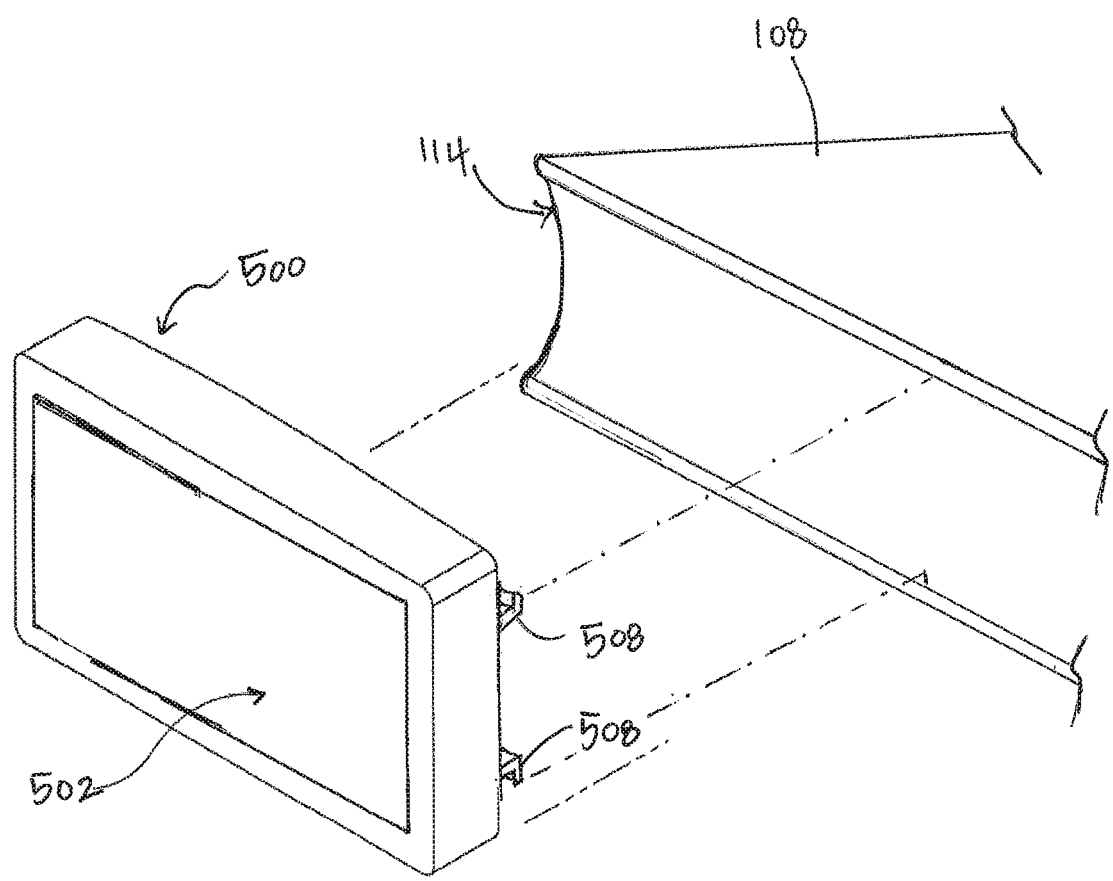
FIGS. 7-10 schematically illustrates an angled view, front view, back view, and bottom view, respectively, of a shelf display unit, in accordance with an embodiment herein.
Figure 8:
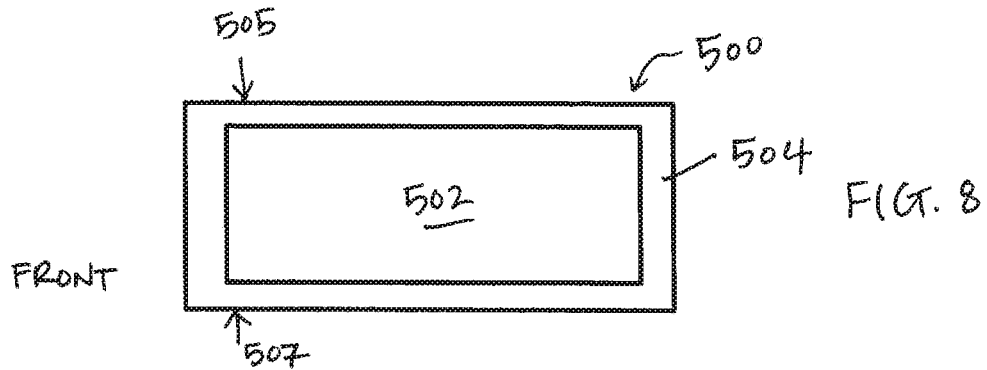
Figure 9:
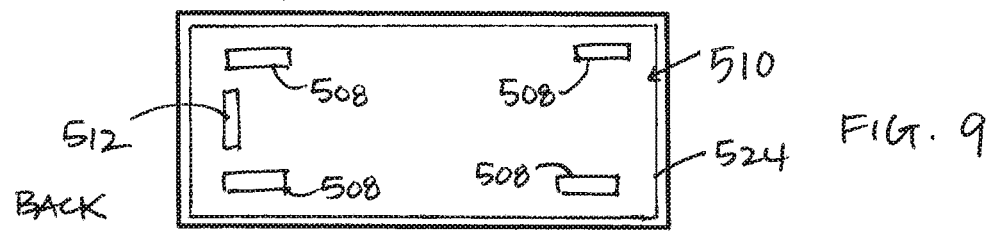

The digital tag 500 as shown includes a display screen 502 on its front 504, which may or may not include a bezel, for example. The digital tag 500 may be removably connected or removably mounted to an edge 114 of a shelf 108 in a shelving unit or system 100. As shown in FIG. 9, the digital tag 500 has a back 510 that together with the front 504 can be considered to form a housing of the digital tag 500. The back 510 may include a cover portion 524 for providing access to one or more batteries (shown schematically as battery 523 in FIG. 11) contained within the housing, for example. Also provided on the back 510 may be structures 508 such as clips or hooks 508 for mounting the housing of the shelf display device 500 to the edge 114 of a shelf module 108. As shown in FIG. 7, for example, the hooks 508 may be clipped under notches or slots provided on top and bottom portions of the edge 114 of the shelf, in order to position the display surface 502 of the display device 500 towards a front and facing a consumer/customer. In another embodiment, the structures 508 may be a pair of cooperating slots that are sized and spaced to allow sliding engagement with cooperating structures on a shelf. The structures 508 can engage cooperating structures on the shelf in a snap fit or a friction interference fit. The structures 508 may represent one element of a hook and loop fastener, or a permanent or temporary adhesive bond, for example. In yet another embodiment, the entire housing of the digital tag 500 may be configured for positioning between notches or slots on the top and bottom portions of the edge 114. As such, the devices or means for attaching the shelf display device 500 or digital tag to the shelf module 108 are not intended to be limiting.

Figure 11:
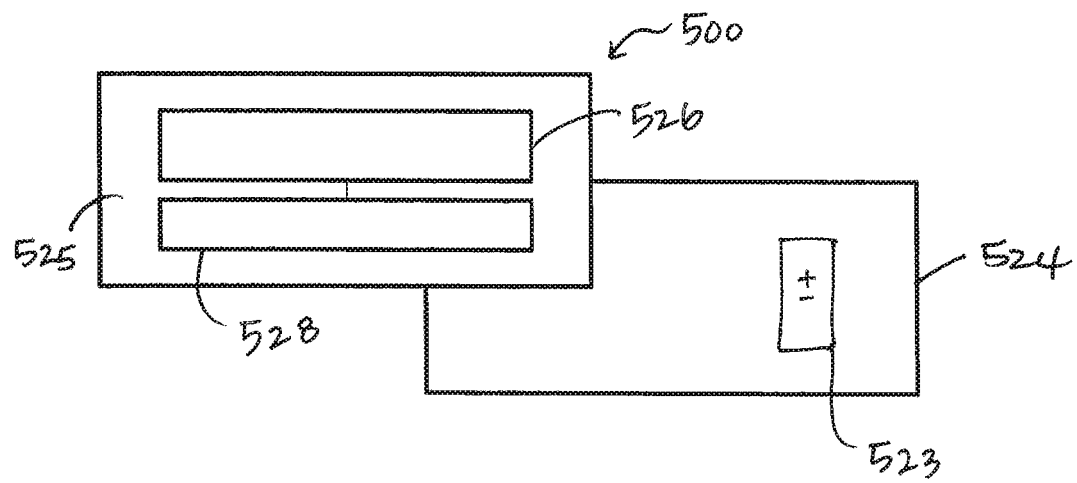
FIG. 11 schematically illustrates an inside view of the shelf display unit of FIGS. 7-10, with a cover removed.
Figure 12:
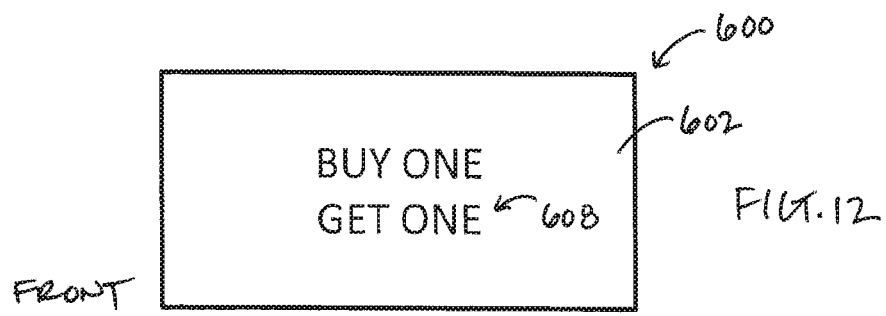
FIGS. 12 and 13 schematically illustrate front and back views, respectively, of a bib tag in accordance with an embodiment herein.
Figure 13:
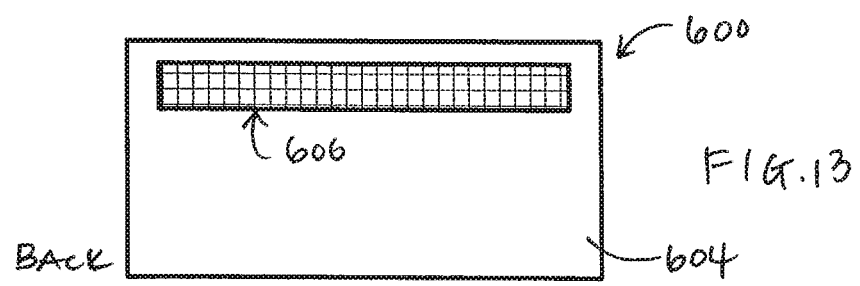
Figure 14:
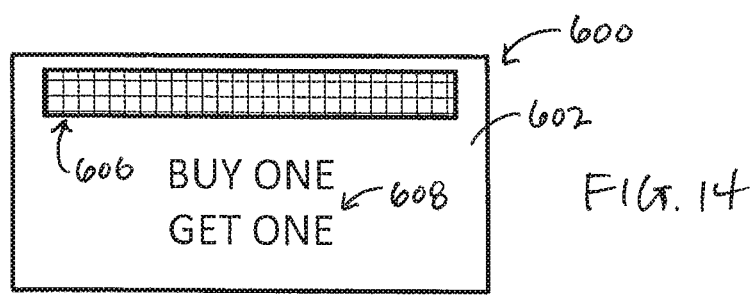
FIGS. 14 and 15 schematically illustrate front and back views, respectively, of a bib tag in accordance with another embodiment herein.
Figure 15:
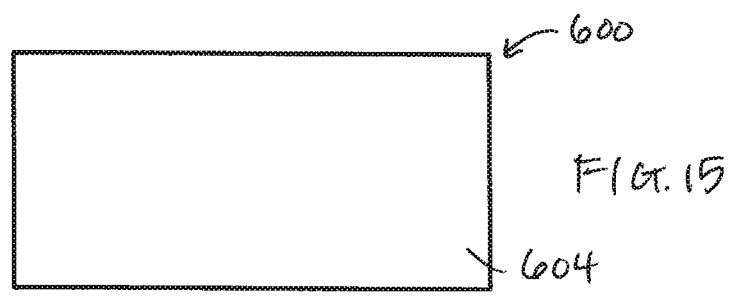

In an embodiment, an indicia-carrying label 512, shown in FIG. 9, may be provided on the back 510 or cover portion 524 of the digital tag 500. Such a label may include, for example, information identifying a communications protocol used by the tag 500, identifying information (e.g., a MAC address, serial number, property number, or the like), or other information about the digital tag 500. The one or more batteries 523 may be provided inside the cover 524 or inside another portion of the housing. The schematic representation shown in FIG. 11 is for explanatory purposes only and not meant to be limiting.

The display screen 502 may be, for example, an e-paper display, and may be black and white or any color. Typically such a display is a three or four color display (black, white, and red or yellow, for example) or a two color display (black, white). The digital shelf tag or shelf display device 500 may use an LCD screen LED, OLED, or even some type of electronic ink screen as its display screen 502.

In an embodiment, the e-paper display is a low or no power bistable display. That is, once the display is set, it draws little or no power to remain in a display mode. In an embodiment, the display may display graphical or text images, and/or barcode information.

In an embodiment, the display is configured to be viewable across a wide range of viewing angles, such that a shopper whose eye level is above or below the display, or to one side, may still view the information displayed thereon. By way of example, the display may be viewable from nearly 180 degrees in each horizontal and vertical direction. In an embodiment, the display is configured, for example with a low glare coating, to reduce glare from light fixtures in the retail store.

Figure 6:
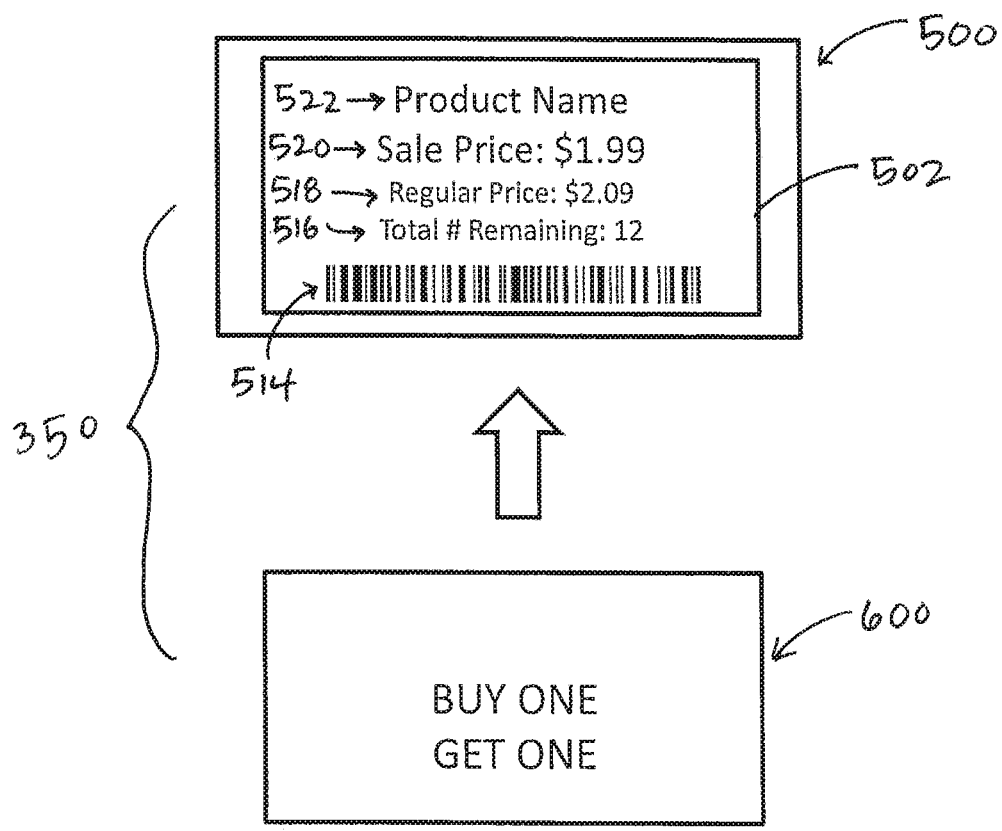
FIG. 6 schematically illustrates details of a shelf display unit and a bib tag used with the disclosed system, in accordance with an embodiment herein.

In an embodiment as illustrated in FIG. 6, the display screen 502 of the digital tag 500 may show, for example, a barcode 514, GTIN, or UPC code (or similar code) for a product, a number of products in stock (such as a total number of items remaining) 516, a full or regular price 518 of the product, a sale price 520 for the product, the product name 522, and even internal information, such as battery or signal strength. In one embodiment, the display screen 502 of the digital tag 500 may display pricing information as indicated by a point-of-sale (POS) system associated with the network 450. Such features are exemplary and all need not be shown on the display 502. In an embodiment, the display may store and display multiple pages, which may be switched periodically or on-demand.

In conjunction with the digital tag or shelf display device 500 is a machine readable bib tag 600. The bib tag 600 is a physical, paper tag for a product that has product-related information and/or indicia displayed thereon. The information need not be product-specific, however. For example, the information may be printed graphics, text or words such as "Sale" or "Buy One, Get One", sale prices or numbers (e.g., "10 for $10"; "Buy X and save X"), and/or similar designs that attract a consumer/customer to a product. The bib tag 600 could be made out of cardboard, cardstock, paper, wood, plastic, metal, organic, or other materials. In an embodiment, the bib tag 600 is reusable and repositionable. For example, if on particular product or item is on sale and then next week a different product or item is on sale, one could use the bib tag 600 in a separate location later. Thus a bib tag 600 could be used over and over. In an embodiment, the bib tag 600 may be provided in the form of a coupon book with tear off sheets for consumers/customers to take with them to check out.

The bib tag 600 may be attachable to the digital tag itself (e.g., see FIG. 4) or to a portion of a shelving system 100 that is proximate the digital tag (e.g., see FIG. 5). The bib tag 600 includes machine readable information or coding that is understandable—either directly or indirectly (e.g., electronically) by the reader 528 of the digital tag 500. The communication device 526 of the digital tag 500 is configured and arranged to transmit information, regarding the machine readable information of the bib tag 600, to the communication network.

Figure 10:
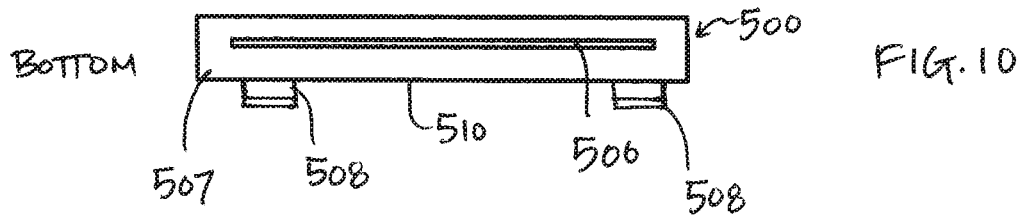

In an embodiment wherein the bib tag 600 is mountable or connectable directly to the digital tag 500, the digital tag 500 may be structured or formed to receive a portion of the bib tag 600 therein. For example, FIG. 10 shows a bottom 507 of the unit or housing of the digital tag/shelf display device 500, in accordance with one embodiment. A slot 506 may be provided therein that provides access to parts contained inside the housing of the device 500. For example, as schematically shown in FIG. 11, wherein said cover 524 is removed, a communication device 526 and reader 528 may be provided within an inside 525 of the housing of the device 500. The communication device 526 and reader 528 may be electronically connected for communication purposes. The communication device 526 may be in the form of a processor or controller, such as a circuit board that has a transmitter, for transmitting information received from the reader 528 to the network (e.g., network 450 as shown in FIG. 19) and/or receiving information from the network (e.g., to display on its display screen 502).

Turning back to FIG. 10, the slot 506 may be configured to receive at least part of the bib tag 600 therein, and, in particular, a part of the bib tag 600 that includes machine readable information 606 or coding contained therein or thereon. For example, a top edge or section of the bib tag 600 may be configured for insertion into the slot 506 of the digital tag 500, the top edge or section including the machine readable information therein or thereon. FIGS. 12-13 and 14-15 show fronts and backs of two non-limiting examples of paper bib tags 600 that may be used and inserted into a slot 506 of the digital tag 500. For example, the bib tag 600 of FIGS. 12 and 13 has displayed (e.g., printed) information or indicia 608 on its front 602 (see FIG. 12) and machine readable information 606 on its back 604. The bib tag 600 of FIGS. 14 and 15 has displayed (e.g., printed) information or indicia 608 on its front 602 in addition to machine readable information 606 (see FIG. 14), while its back 604 may be blank (or it may include other information). Accordingly, depending on the placement and/or type of reader 528 associated with the digital tag 500, the machine readable information 606 may be provided on the bib tag 600 such that it is positioned for reading by the reader 528, e.g., such as when the bib tag 600 is inserted into the slot 506.

Figure 16:
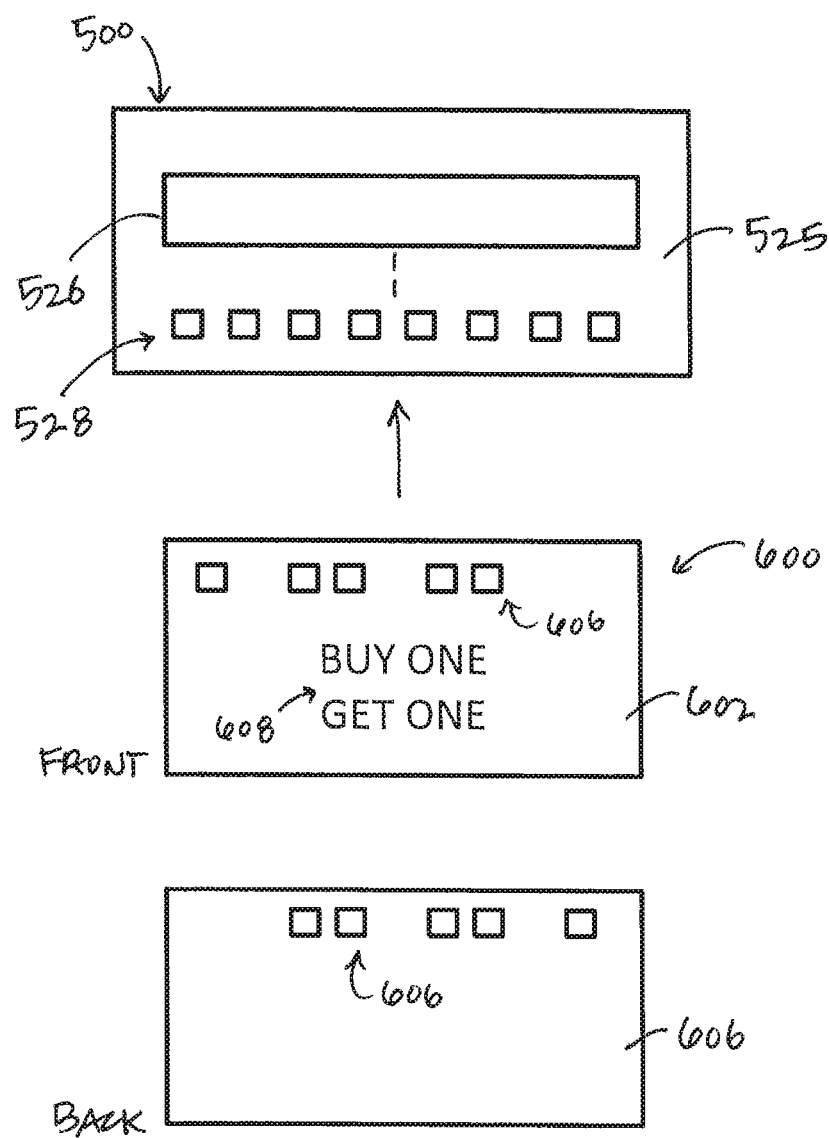
FIG. 16 schematically illustrates an inside of a shelf display unit and front and back views, respectively, of a bib tag in accordance with yet another embodiment herein.

The machine readable information 606 may be an RFID code, a magnetic strip, an optical display, or a bar code, for example. The type of readable code on the bib tag 606 is not intended to be limiting in any way. For example, a Global Trade Identification Number (GTIN), UPC, UPC-A, UPC-E, EAN13, EAN8, Databar (multiple versions), GS1-128, and any other product identification code known to persons with skill in the art may be provided on the tag 600. In one embodiment, the machine readable information 606 of the bib tag 600 is provided in the form of notches, voids, or perforations (e.g., openings or holes that extend through the front and back of the paper of the bib tag 600) in, on, or through the surface of the tag material. For example, in the embodiment schematically shown in FIG. 16, the reader 528 on the inside 525 of the digital tag 500 includes multiple optical features for reading (shown as squares). These optical features may include a light source or LED, for example. Once the bib tag 600 is placed in alignment with the optical features of the reader 528, the notches, voids, or perforations 606 thereon may be read by, cover a portion of, or block some of the optical features, and result in a reading by the controller 526 of the digital tag 500.

The type, structure, and/or placement of the machine readable information 606 of the bib tag 600 is not intended to be limiting. In an embodiment, the bib tag 600 may have a USB like plug or an RFID chip thereon, that is understandable and/or readable by a corresponding reader 528 of the digital tag 500. In an embodiment, the bib tag 600 may also have a machine-readable aspect printed thereon.

The bib tag 600 may be encoded with time sensitive information and/or other information to be communicated to the consumer. The bib tag 600 includes, for example, a text message that indicates information relating to the goods displayed on the shelves close to the digital tag 500. The information may, in general, include information that is relevant to consumer purchase decisions and more particularly may be time-sensitive information such as conveying that an item is on special for a particular period of time.

The bib tag 600 may include any number or type of attachments or mechanisms, such as mechanical attachments, including pinching, clasping, clipping, magnetic, or adhesives and/or stickers, and are not limited. Magnets may also be used to attach bib tags 600. In an embodiment, the bib tag 600 is configured for electrical connection with the digital tag 500 and/or shelf 108.

In an embodiment, such as shown in FIGS. 1 and 5, the display surface 502 of the digital tag 500 is associated with a digital panel 120 extending across a length of an edge 114 of a shelf 108 in a shelving unit for holding products thereon. In such a case, the bib tag 600 may be configured for electronic connection to the shelf display and/or panel 120.

Figure 17:
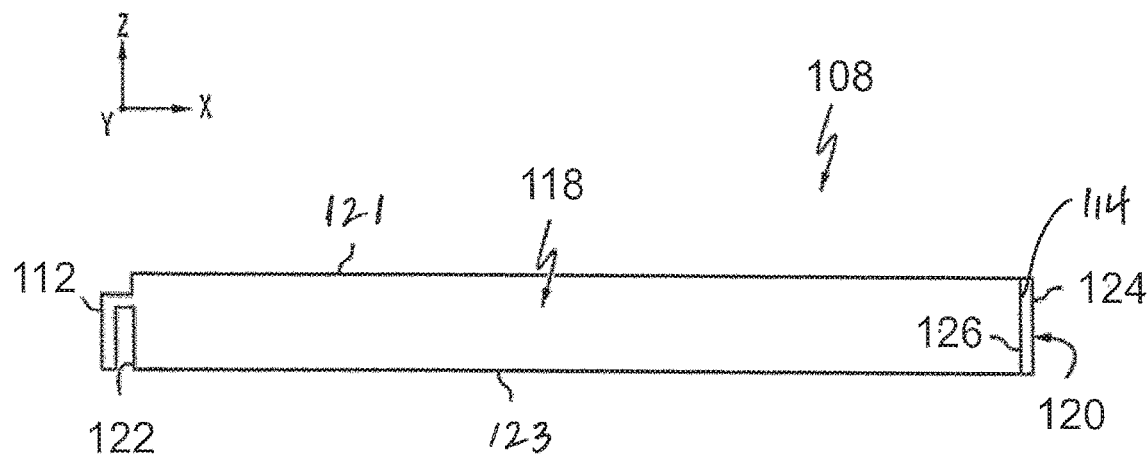
FIG. 17 schematically illustrates a side plan view of a display shelf module for use in a shelving unit in accordance with another embodiment of the system.

Referring now to FIG. 17, a cross section of a display shelf module 108 is schematically depicted according to one or more embodiments described herein. The display shelf module 108 generally includes a top panel 121 and an optional bottom panel 123 which may generally define an open (hollow) interior volume 118. The shelf 108 may additionally include side panels (not shown) which connect the top panel 121 and the bottom panel 123 and further define the open interior volume 118. The top panel 121 is generally planar and facilitates the placement of products on the display shelf module 108 for viewing and selection by a customer. In some embodiments, the optional bottom panel 123 may be a substantially planar, solid sheet of material which completely encloses the bottom surface of the display shelf module 108. In other embodiments, the optional bottom panel 123 may comprise an open grill or grid work of discrete elements. In still other embodiments (not depicted), the optional bottom panel is omitted from the construction of the display shelf module 108. In the embodiments described herein, the display shelf module 108 also includes a rear panel 122 to which the mounting clip 112 is either coupled to or integrally formed with. The top panel 121, rear panel 122, side panels, and optional bottom panel 123 are formed from materials suitable for load bearing applications including, without limitation, steel, or aluminum alloys. Further, in some embodiments, the top panel 121, rear panel 122, side panels, optional bottom panel 123, or various combinations thereof, may be formed from a single sheet of material, such as sheet stock or the like, which is formed into the display shelf module 108. Alternatively, the top panel 121, rear panel 122, side panels, and optional bottom panel 123 may be formed from separate sheets of material and joined together by welding, threaded fasteners, and/or various combinations thereof.

Still referring to FIG. 17, the display shelf module 108 further comprises a single display panel 120 affixed to the front edge 114 of the display shelf module 108. The display panel 120 substantially extends continuously and uninterrupted in the width direction (i.e., in the +/−Y direction of the coordinate axes shown in FIG. 17) of the front edge 114 of the display shelf module 108 and is generally formed from a translucent material. For example, in some embodiments, the display panel 120 is formed from a translucent polymeric material. In some embodiments, the display panel 120 may have a laminated structure. In other embodiments, the display panel 120 may be formed from a transparent polymeric material to which one or more layers of translucent film are applied, such as, for example, a Vikiti™ film manufactured by 3M. In still other embodiments, the display panel 120 may be formed from a thin glass substrate to which a translucent film is applied.

In some embodiments, the display panel 120 may further include a plurality of Fresnel lines formed in a back surface 126 of the display panel to improve the quality of the image data displayed on a front surface 124 of the display panel. For example, in one embodiment, the density of the Fresnel lines may be about 50 lines per centimeter. In another embodiment, the number of Fresnel lines may be greater than about 50 lines per centimeter, such as 100 lines per centimeter or more. Suitable screens incorporating Fresnel lines may be obtained from DNP Denmark including, without limitation XPS and CSI screens available from DNP Denmark. However, it should be understood that the geometry of the Fresnel pattern and the density of the Fresnel lines may be specifically tailored to the optical path between the projector and the screen.

The display panel 120 is generally constructed to facilitate the display of image data on the front surface 124 of the display panel 120 when an optical signal containing the image data is projected from within the interior volume 118 of the display shelf module 108 onto the back surface 126 of the display panel. Accordingly, it should be understood that the display panel 120 is a transmission-type screen.

The display panels 120 may be provided on one or more of the shelves 108. The display panels 120 extend beneath the shelves 108 and are operable to display information to a person near the shelving modules, such as information pertaining to products 300 on the plurality of shelves 108, information useful to stock products on the plurality of shelves 108, information useful to retrieve products from the plurality of shelves 108, and a variety of additional information.

In some embodiments, each of the plurality of display panels 120 is powered by an Ethernet connection or through the back plane portion 106, as described in U.S. patent application Ser. No. 13/734,443, filed Jan. 4, 2013 and issued under U.S. Pat. No. 9,703,179 on Jul. 11, 2017, the entirety of which is incorporated by reference herein. In other embodiments, each of display panels 120 may be powered by a power distribution system. In some embodiments, the display panels 120 may be powered in another manner, such as via batteries, solar panels, or the like. In some embodiments, each of the display panels 120 may include a projector unit and a display screen, as described in the incorporated '179 patent. In other embodiments, one or more of the display panels 120 includes a powered display screen, such as a TFT screen, an LCD screen, or the like. In some embodiments, the modular shelving system 100 may include one or more additional input or output components, such as a microphone (e.g., for receiving voice input from a consumer), a camera, a barcode reader, a speaker, or the like.

In some embodiments described herein, the display shelf module 108 may be sealed to prevent exposing the projector and various optical and electronic components located within the display shelf module 108 to the external environment. For example, it is contemplated that the display shelf module 108 may be utilized in a refrigerated environment, an elevated temperature environment or outside in the atmospheric environment. In these embodiments, the top panel, rear panel, side panels, bottom panel, and display panel may be assembled with seals between the various panels to prevent moisture and/or condensation from entering the display shelf module 108. Suitable sealing materials include, without limitation, silicone, in particular RTV (room temperature vulcanizing) silicone, natural or synthetic elastomers or similar commercially available sealing materials.

In addition, the display panel 120 of the display shelf module 108 may comprise an anti-fog coating to prevent condensation on either the front or back surface of the display panel.

Figure 18:
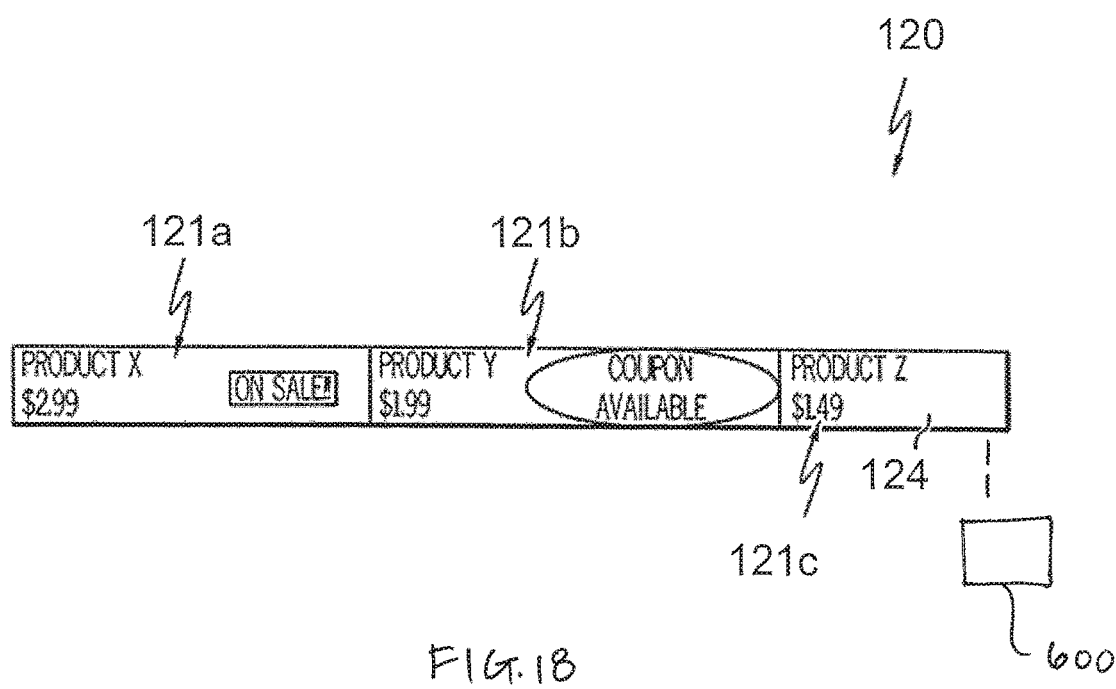
FIG. 18 schematically illustrates a front plan view of the display shelf module of FIG. 17 in accordance with an embodiment.

Referring to FIG. 18, by way of example, the front surface 124 of the display panel 120 of the display shelf module 108 is schematically depicted displaying image data 121a, 121b, 121c projected onto the back surface of the display panel 120. As shown in FIG. 18, the image data 121a, 121b, 121c projected onto the back surface of the display panel 120 is visible to a customer positioned in front of the display shelf module 108 and generally conveys information related to the products positioned on the display shelf module 108, such as, for example, the identity of the product, the size of the product, the price of the product, the manufacturer of the product, sale information, coupon information and other, similar information (e.g., such as the information discussed with reference to FIG. 6 and digital tag 500). In the embodiment shown in FIG. 18, information related to several different products may be simultaneously displayed on a single display screen. Accordingly, it should be understood that, in this embodiment, the segmentation of the display panel 120 into different product "labels" is a result of the content of the image data 121a, 121b, 121c projected onto the panel and is not necessarily due to the actual segmentation of the panel into individual, discrete screens.

As such, in accordance with an embodiment, it could be said that the display panel 120 is the digital tag with a display screen, reader for machine readable information, and communication device/controller. For example, the features described above with reference to reader 528 and communication device 526 of digital tag 500 may be provided on the back or front of the display panel 120 and/or in the interior space 118 of the shelf 108, for example.

In another embodiment, both a display panel 120 and a digital tag 500 may be associated with a product(s) in the store (e.g., see FIG. 5). In an embodiment, both the display panel 120 and the separate digital tag 500 may be configured to communicate with bib tags 600.

Various visual media content may be projected onto the display panel 120. For example, in a "normal" mode, the display panel may display information about the products located on the display shelf module 108 (i.e., price, quantity, discounts and the like). Alternatively, the display panel may display other information. For example, the display panel may display store information, such as the location of certain sale items, manufacturer advertising (still and video), and/or store messages (i.e., store operating hours, safety alerts, and the like). Such information can be directly uploaded from a network or external computer system such that the information is displayed on a real time basis. Interactive content may also be displayed, as will be described in more detail herein.

In a non-limiting embodiment, the display panel 120 may include a projection system, such as is described in U.S. Pat. No. 9,703,179, herein incorporated by reference in its entirety. Alternately, it may be an LCD, LED, or OLED display, for example.

In an embodiment, in conjunction with the display 120 and/or the digital tag 500, a machine readable bib tag 600 is attachable to the digital tag or to a portion of a shelf or panel 120 that is proximate the digital tag. For example, as shown in FIG. 5, one or more bib tags 600 may be attached to the display panel 120 of a shelf such that the machine readable information 606 associated with each bib tag 600 is readable by either the display panel 120, the digital tag 500, or both. Either or both of the display panel 120 and the digital tag may be configured to understand and/or communicate information provided by the machine readable information or code of the bib tag 600 to the network 450. In an embodiment, such as represented in FIG. 18, the bib tags 600 may associated with a part of the panel 120, e.g., an end of the panel.

Whether the bib tag 600 is physically (either directly or indirectly) connected to the digital tag 500 or display panel 120, and/or electronically connected to either, the reader 528 associated with the digital tag 500 may be configured to read the code or information 606 of the bib tag 600 and determine if the code 606 or information is current or up-to-date. For example, the information or indicia 608 on the front of the bib tag 600 may be applicable for a certain time period. The digital tag 500 may, in conjunction with the communication network, perform periodic checks to ensure that the bib tag 600 contains currently applicable consumer information (e.g., pricing as indicated in a point-of-sale (POS) system associated with the network 450). For example, the digital tag 500 may communicate with the network and receive a signal regarding if the code on bib tag 600 is current or applicable based on a time period or day of the week. If the bib tag 600 is not current, then the store management system can be informed (via transmitting a notice or signal to the system) so that a sales associate or manager can take appropriate action, e.g., remove the physical paper bib tag 600 because it is outdated, add or update the bib tag because it is outdated or missing entirely, etc.

As another example, in the case wherein the bib tag 600 includes a coupon book with tear off sheets as a bib tag, the bib tag 600 may include machine readable information that is revealed to the reader 528 of the digital tag 500 once all of the tear off sheets are removed. In other words, a machine readable information or pattern may be revealed to the reader 528 such that it can be communicated via communication device 526 that the coupon booklet is empty. In an embodiment, a sales associate or manager may be alerted via the system when such information is received.

Accordingly, this disclosure also provides a method for displaying product information in a store using a system that is configured to communicate with a communication network. The system includes the digital tag 500 (or display panel 120, if it includes a reader and communication device associated therewith) and the physical, bib tag 600 for the product, the bib tag having product-related information displayed thereon and machine readable information or code. The method at least includes: displaying information associated with a product via the display surface 502 of the digital tag 500, reading the machine readable code or information 606 of the bib tag 600 using the reader 528 of the digital tag 500; and transmitting information, regarding the machine readable information 606 of the bib tag 600, to the communication network 450 using the communication device 526 of the digital tag.

Of course the method may further include one or more of the following steps: connecting the bib tag to the digital tag before the reading of the machine readable information; and/or inserting a portion of the bib tag 606 into the slot 506 of the digital tag 500, the portion having the machine readable information 606 provided thereon.

In accordance with an embodiment, the method may include, after initially transmitting information to the communication network, setting a timer for a predetermined period of time, and, after the predetermined period of time, understanding and/or reading the machine readable information of the bib tag using the reader of the digital tag. A determination may then be made, by either the network or the digital tag 500, if the product-related information on the bib tag 600 is expired. If it is determined that the product-related information displayed on the bib tag is expired, then an alert may be issued (e.g., to the sales associate or to a reporting system) to take action with regards to the particular bib tag (e.g., remove or replace the bib tag).

In one embodiment, if the product-related information displayed on a bib tag 606 is determined to be expired, then a printer (e.g., printer 406B in FIG. 19) may be instructed through network 450 (e.g., using server 400) to print a new bib tag to replace the expired bib tag.

The digital tag 500 may be of a type that is remotely updateable via a communications network. For example, the tag may communicate with its communication device 526 (or controller) via an 868 MHz or 915 MHz ISM Band 2-way wireless network. Alternately, Wi-Fi, Zigbee, Z-wave, cellular, infrared, ultraviolet, and/or Bluetooth protocols may be used. The communications network may supply the digital tag 500 with information to be displayed, and may likewise be used to provide control signals to the digital tag 500. For example, in a digital tag 500 configured to display multiple pages, the communications network may, in an automated or user-directed manner, be used to command the digital tag 500 to switch among the pages stored. In an embodiment, a local server may be used to control the digital tags 500 via a wireless network as described above, or via a wired network. The communications network may be a mesh network, a star network, a LAN, a WAN, or a combination network. The communications network may, in principle, track location information for each of a plurality of digital tags 500. By way of example, direction and distance from one or more nodes of the communication network may be used to locate each tag using Received Signal Strength Indicator data (RSSI), for example.

FIG. 19 shows a schematic overview of exemplary parts of a network 450 and system 350 used herein, which are not at all intended to be limiting. Rather, the schematic drawing represents features that communicate and transmit information. The system 350 with the digital tag 500 (and/or display panel 120) and bib tag 600 is provided in or near the store. As previously described, information or code from the bib tag 600 is read by the digital tag 500 (and/or display panel 120). Information relating to the bib tag 600 is transmitted to the computing system or server 400 that is part of the network 450. Generally, the network 450 communicatively couples the store computing system or server 400, one or more databases 402 and 404, at least one associated device 406A and/or 406B, a point-of-sale (POS) system 408, and the digital tags 500 (and/or display panels 120) via communication lines 410 and routers 412 such that data may be exchanged between such components that connected to the network. The server 400 is communicates with the network 450 and may receive data from and provide/transmit data to the associated device 406A and/or 406B, the databases 402 and 404, point-of-sale (POS) system 408, and the digital tags 500 (and/or display panels 120).

The computing system or server 400 acts as a logic engine to manage the communication network and any associated devices 406A, 406B. The logic engine includes hardware such as one or more server-grade computers, but also includes the ability to perform certain computational functions through software, hardware, or firmware. Further, in one embodiment, the logic engine or server 400 may serve as the main database for the retail establishment, including, but not limited to, a product database and a shopper profile database. In another embodiment, such as shown in FIG. 19, one or more databases 402 and 404 may be provided that are separate from the logic engine/server 400 while remaining in communication therewith. Databases 402 and 404 may be on-site or off-site with respect to the store. The POS system 408 may be on-site or off-site with respect to the store. In an embodiment, the POS system 408 is a master database provided at a remote data center. The POS system 408 may contain price and template/content information to display on either or both of the digital tag 500 and/or bib tag 600. In one embodiment, the server 400 may be provided on-site in the store, while the POS system 408 is located remotely from the store. Functionally, the logic engine typically routes, organizes, manages, and stores data received from other members of the communication network 450.

The computing network 450 may include one or more computer networks (e.g., a wide area network, a personal area network, or a local area network), one or more cellular networks, one or more wired or wireless networks, one or more satellite networks, or combinations thereof. Accordingly, each of the digital tags 500 and/or display panels 120 may be communicatively coupled, using communication lines 410, to the computing network 450 via a wide area network, via a local area network, via a personal area network, via a cellular network, via a satellite network, or the like. They may also be connected to each other and/or to local hubs to form a mesh, a LAN, or a WAN network. Suitable wide area networks may include wired or wireless telecommunications networks that transmit information via coaxial cables, fiber-optic cables, radio-frequency transmission, or the like. Suitable local area networks may include wired ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In one embodiment, network 450 is a mesh communication network. An exemplary mesh communication network is a ZIGBEE communication network which operates within the Institute of Electrical and Electronics Engineers (IEEE) 802.15.4 communication protocol, but a person with skill in the art will appreciate alternative communication protocols that can be employed, such as other IEEE 802.15.4 compliant alternatives or communication protocols not using IEEE 802.15.4, such as Z-Wave or BLUETOOTH to name only a few. Some of the benefits of using ZIGBEE communication network as a mesh communication network are its low power consumption, low cost of implementation, high density of component use (e.g., the use of dozens, if not hundreds, of multi-network routers and/or wireless end devices for one mesh communication network), and its simple communications protocol. ZIGBEE protocols are intended for use in wireless communication networks requiring low data rates and low power consumption. ZIGBEE communication network also provides an inexpensive communications multi-network that can be used for industrial control, embedded sensing, medical data collection, smoke and intruder warning, building automation, home automation and many others. The resulting network uses very small amounts of power which can then allow individual devices to run for up to one year or more using originally installed batteries.

The ZIGBEE protocol operates in the industrial, scientific and medical (ISM) radio bands; i.e., 868 MHz in Europe, 915 MHz in the USA and 2.4 GHz in most other jurisdictions worldwide. ZIGBEE technology is intended to be simple, inexpensive and readily maintainable. In one execution, the most capable multi-network router within ZIGBEE communication network requires only about 10% of the software of a typical BLUETOOTH or other wireless internet node though a BLUETOOTH execution is also contemplated herein. In another execution, multi-network router only contains about 2% of the software of a typical BLUETOOTH or other wireless internet node for use within ZIGBEE communication network 15 thus greatly reducing technical complexity and potential maintenance costs.

In accordance with an embodiment, the network 450 may be a mesh network or a multi-communication network as described in U.S. Pat. No. 8,050,984 B2, which is hereby incorporated by reference herein in its entirety.

To avoid doubt, the information transmitted and received by the digital tag 500 and server 400 can travel in a myriad of aforementioned ways. The objective is to get the information to a central location (server 400) and confirm the information of the bib tag 600 remains correct and up-to-date relative to the POS price that is displayed by the digital tag 500.

Each router 412 in the network may be generally placed in a location that is out of sight and/or reach of persons shopping or working in retail establishment, e.g., in a grid, close to in the ceiling of the store. The routers 412 may include one or more radios for communicating information as well as a computer component complete with its own IEEE address; the computer component allows the information collected by any of the radios to be transmitted over cable wires (used as communication lines 410) to the logic engine/server 400. The routers 412 may be a part of a grid that contains access points throughout the retail store, such that the access points may communicate with the digital tag 500.

System communication lines 410 are shown connecting each router 412 to the logic engine/server 400 as well as connecting devices (digital tag 500, POS system 408, printer 406B, etc.) and databases to the routers 412. The system communication lines 410 can be either wireless or wired. An ethernet cable is an exemplary wired connection device that may be used between each router 412 and the server 400. The system communication lines 410 shown in the Figures are merely exemplary, as system communication lines 410 connect from every router and device to server 400. In exemplary embodiments, the system communication lines 410 connect routers 412 to one another. In an embodiment, the communication lines connecting the routers 412 to the devices (digital tag 500, POS system 408, printer 406B, etc.) and databases 402, 404, and 408 are wireless.

In an embodiment, the associated device 406A is a portable device such as a cellular phone. In another embodiment, the associated device 406B is a printer. For example, when an alert is received, the server 400 may use either a phone or a printer to output the alert to a manager or sales associate. The databases 402 and 404 and/or POS system 408 may be used to update product information, including a sales price for product(s), which is generally known in the art. Further, the databases and/or POS system 408 may communicate via network 450 to update the display screen 502 of the digital tag 500 with the updated product information. In an embodiment, the server 400 is notified that there is updated product information. In an exemplary embodiment, the server 400 or computer is used to notify store management of the updated product information, and thus a possibility for updating the bib tags 600.

While in the foregoing specification this invention has been described in relation to certain particular embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

What is claimed is:

1. A system for displaying product information in a store, the system being configured to communicate with a communication network, the system comprising:
    a digital tag positioned within the store, the digital tag comprising a digital display surface, a reader, and a communication device, the digital tag being configured to display information associated with a product via its display surface and configured for operative communication with the communication network via its communication device;
    a physical, bib tag for the product, the bib tag having product-related information displayed thereon,
    wherein the bib tag comprises machine readable information that is readable by the reader of the digital tag, and
    wherein the communication device of the digital tag is configured and arranged to transmit information, regarding the machine readable information of the bib tag, to the communication network.

2. The system according to claim 1, wherein the bib tag is mountable to the digital tag.

3. The system according to claim 1, wherein the digital tag is a unit removably connected or removably mounted to an edge of a shelf in a shelving unit for holding products thereon.

4. The system according to claim 3, wherein the digital tag comprises a housing with a slot, wherein the bib tag is configured for insertion into the slot, and wherein the machine readable information provided on the bib tag is positioned on the bib tag such that it is read by the reader of the digital tag upon insertion of the bib tag into the slot.

5. The system according to claim 1, wherein the display surface is associated with a digital panel extending across a length of an edge of a shelf in a shelving unit for holding products thereon.

6. The system according to claim 5, wherein the bib tag is configured for electronic connection to the shelf display.

7. The system according to claim 1, wherein the reader of the digital tag is an optical reader, and wherein the bib tag comprises notches or perforations that are read by the reader.

8. The system according to claim 1, wherein the bib tag comprises an RFID code or a bar code thereon.

9. A method for displaying product information in a store using a system that is configured to communicate with a communication network, the system having a digital tag comprising a digital display surface, a reader, and a communication device and a physical, bib tag for the product, the bib tag having product-related information displayed thereon and comprising machine readable information that is readable by the reader of the digital tag, and the method comprising:
    displaying information associated with a product via the display surface of the digital tag;
    reading the machine readable information of the bib tag using the reader of the digital tag; and
    transmitting information, regarding the machine readable information of the bib tag, to the communication network using the communication device of the digital tag.

10. The method according to claim 9, further comprising:
    connecting the bib tag to the digital tag before the reading of the machine readable information.

11. The method according to claim 9, wherein the digital tag comprises a housing with a slot, and the method further comprises:
    inserting a portion of the bib tag into the slot of the digital tag,
    wherein the machine readable information is provided on the portion of the bib tag that is inserted into the slot.

12. The method according to claim 9, further comprising:
    after transmitting information to the communication network, setting a timer for a predetermined period of time;
    after the predetermined period of time, reading the machine readable information of the bib tag using the reader of the digital tag; and
    determining that the product-related information displayed on the bib tag is expired.

* * * * *